United States Patent [19]
Palmer et al.

[11] Patent Number: 4,943,813
[45] Date of Patent: Jul. 24, 1990

[54] METHOD OF GENERATING OVERHEAD TRANSPARENCY PROJECTING USING AN INK-JET DEVICE

[75] Inventors: Donald J. Palmer, San Diego; Peter C. Morris, El Cajon, both of Calif.

[73] Assignee: Hewlett-Packard Company, Palo Alto, Calif.

[21] Appl. No.: 412,581

[22] Filed: Sep. 25, 1989

Related U.S. Application Data

[63] Continuation of Ser. No. 244,545, Sep. 13, 1988, abandoned, which is a continuation of Ser. No. 57,132, Jun. 1, 1987, abandoned.

[51] Int. Cl.$^5$ .............................................. B41J 2/01
[52] U.S. Cl. ................................ 346/1.1; 346/140 R
[58] Field of Search ........................... 346/1.1, 140, 75

[56] References Cited

U.S. PATENT DOCUMENTS

| | | | |
|---|---|---|---|
| 3,977,007 | 8/1976 | Berry et al. | 346/1.1 |
| 4,320,406 | 3/1982 | Heinzl | 346/140 |
| 4,412,225 | 10/1983 | Yoshida | 346/1.1 |
| 4,540,996 | 9/1985 | Saito | 346/140 |
| 4,547,786 | 10/1985 | Logan | 346/140 |
| 4,550,053 | 10/1985 | Arai | 346/135.1 X |
| 4,617,580 | 10/1986 | Miyakawa | 346/136 |
| 4,631,548 | 12/1986 | Milbrandt | 346/1.1 |
| 4,680,596 | 7/1987 | Logan | 346/140 |
| 4,721,968 | 1/1988 | Arai | 346/136 |

OTHER PUBLICATIONS

D. R. Titterington et al, "Development of a Transparent Receiving Sheet for Ink-Jet Printing", Journal of Imaging Science, vol. 30, No. 1, pp. 4–8, Jan./Feb. 1986.

Titterington et al; Development of a Transparent Receiving Sheet for Ing-Jet Printing; Journal Imaging Science, v. 30, N. 1, Jan./Feb. 1986, p. 4–8.

*Primary Examiner*—Joseph W. Hartary

[57] ABSTRACT

Printing of overhead transparencies, comprising non-absorbent, hydrophobic media such as polyester, is accomplished by an ink-jet printer by providing a time delay between printing of dots (10) at the same location or by printing adjacent dots. In one embodiment, a line is printed with dots at selected locations and the line is then reprinted with dots at the same locations, using the same color or a different color, as desired. An area-fill pattern (20), produced in accordance with the invention, is substantially homogeneous, lacking the drip lines and non-homogeneity (18) resulting from coalescence of prior art approaches.

14 Claims, 1 Drawing Sheet

METHOD OF GENERATING OVERHEAD TRANSPARENCY PROJECTING USING AN INK-JET DEVICE

CROSS REFERENCE TO RELATED APPLICATION

This is a continuation of co-pending application Ser. No. 07/244,545 filed on Sept. 13, 1988 which is a continuation of application Ser. No. 07/057,132, filed June 1, 1987, now abandoned.

TECHNICAL FIELD

This invention is related to ink-jet devices, such as ink-jet printers, and, more particularly, to methods of enhancing and optimizing image density on transparent media, such as surface-modified polyester films for use in overhead transparency projection.

BACKGROUND ART

The use of ink-jet printers to form images such as alpha-numeric characters and graphics on absorbent media such as paper is well-known.

However, the use of the same inks on transparent media, such as polyester films, commonly known as Mylar, has not produced the same high optical density of print, which results in intense colors, obtained with inherently absorbent media. As is currently available, such non-absorbing media, even when an "ink-receptive" coating is applied, suffer from inherently long drying times, moisture sensitivity, non-homogeneous area fill, and low optical densities.

Attempts have been made to remedy the situation in which ink-jet transparencies are slow to dry or lack capacity to absorb sufficient volumes of ink, with a goal of approaching performance obtained with highly absorbent media. One such attempt is described in a technical paper by D. R. Titterington et al, "Development of a Transparent Receiving Sheet for Ink-Jet Printing", *Journal of Imaging Science*, Vol. 30, No. 1, pp. 4–8 (Jan/Feb 1986). This paper describes the use of certain transparent hydrophilic coatings to permit the use of aqueous-based inks for printing on transparent media. However, this reference addresses the problem of slow drying transparencies and does not disclose ways to improve image quality.

While such coatings are useful, considerable work remains to be done to develop suitable inks and methods of application that permit substantially uniform high color density images to be produced on transparent, non-absorbing media approaching that which can be produced on absorbing media such as paper.

DISCLOSURE OF INVENTION

In accordance with the invention, a method is provided for improving the image quality generated on an optically transparent receiver sheet that has been coated with an ink-receptive layer, by the strategic application of individual ink droplets as applied by an ink-jet device. An example of an ink-receptive coating comprises a water-insoluble, polyvinyl pyrrolidone-based hydrophilic coating, available from Arkwright, Inc., Fiskeville, R.I., under the trade designation TP161.

The method of the invention comprises applying an optimal volume of ink in successive printhead passes. Examples of successive printhead passes include (a) printing a first dot of color at a selected location in a first pass or scan and printing a second dot of color at the same location in a second scan; (b) printing alternate dots of color in successive scans; and (c) printing alternate lines of color in successive scans.

The advantage of the method of the invention is that higher density images can be achieved without suffering from ink coalescence or drip-lines. Thus, for example, overhead transparency projections, such as formed on a polyester (Mylar) film that is coated with an ink-receptive coating, evidence a more homogeneous, higher intensity of color than heretofore obtained.

BEST MODES FOR CARRYING OUT THE INVENTION

A single pass, or scan, of a print head depositing an amount of ink on the afore-mentioned overhead projection transparency receiver sheet yields a non-uniform, low quality image, as a consequence of undesirable drop displacement due to film motion, gravity and drop-to-drop cohesion. The result is a non-homogeneous, low optical density image.

Figure 2A:
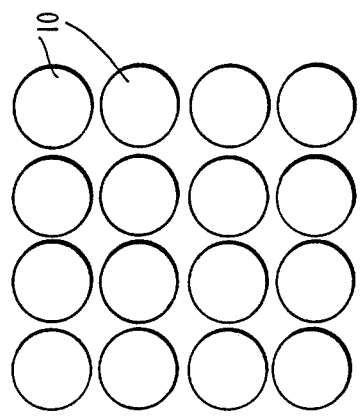
FIG. 2a is a top plan view, showing the pattern of a series of non-coalescing drops, printed in accordance with the invention.
Figure 1A:
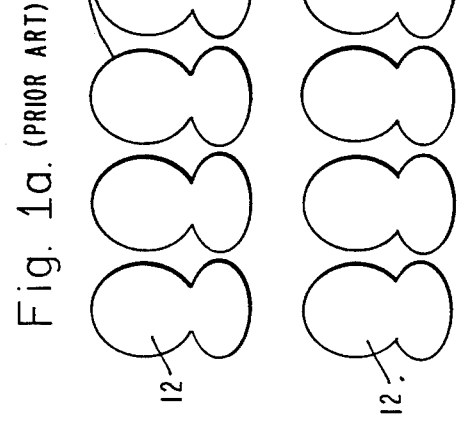
FIG. 1a is a diagrammatic, top plan view, showing a series of coalescing drops printed by prior art methods.

It is observed microscopically that each individual ink-jet droplet 10, printed in a pattern such as shown in FIG. 2a, can coalesce with adjacent droplets to form droplets 12, shown in FIG. 1a, which induce area-fill patterns that are substantially non-homogeneous. Furthermore, under conditions of considerable coalescence and with the overhead projection overhead transparency receiver sheet oriented in a vertical plane during printing, a phenomenon known as "drip lines" is observed. The phenomenon of drip lines is a result of a substantially large volume of ink located on the surface of the transparency receiver sheet which is influenced by gravity. Instead of the preferred absorption of individual droplets into the coated receiver sheet, these large coalesced drops 12 migrate downward along the vertically-oriented page, as shown in FIG. 1a. The result is a notable color striation that exists along each printed swath 18 by virtue of the solid density gradient that results from each drop migration.

Figure 1B:
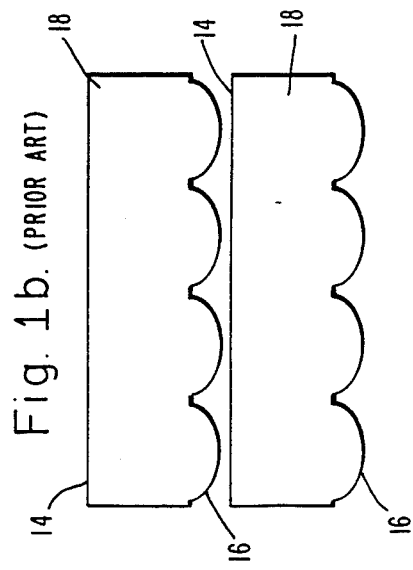
FIG. 1b is a diagrammatic, top plan view, depicting the area-fill resulting from the prior art printing methods.

In addition, drip lines aggravate the problem of color area-fill homogeneity by preventing the merging of adjacent drops along the top 14 and bottom 16 dot rows of the printed swath 18, as shown in FIG. 1b.

A single scan employing the necessary volume of ink required to avoid drop coalescence should meet the following condition at the time of printing a drop:

$$\phi \leq 1/D \qquad \text{Eqn. 1}$$

where $\phi$ is the spot diameter and D is the dot-to-dot spacing (resolution).

However, the volume of ink described by Eqn. 1 may not provide the desired color density for overhead transparency projections. Therefore, in accordance with this invention, the use of at least one successive pass of the ink-jet printing device, where the conditions of Eqn. 1 are met, provides a substantially improved color density.

Thus, in an illustrative example, in a first scan, only one color is deposited on the medium. Then, instead of following immediately behind with depositing a second color over dots of the first color, as is done in the prior art, the first scan is completed. After completion of the first scan, the print head returns to the beginning of the line and repeats the scan, printing either another dot of the same color on top of the previously printed dot, or a dot of a different color on top of the previously printed dot. In either case, a total of two ink drops have been applied, one on top of the other in two applications.

In the time required to complete one scan and return to the beginning of the line, the first color has begun absorbing into the medium, and the addition of the second drop does not induce drip lines.

Figure 2B:
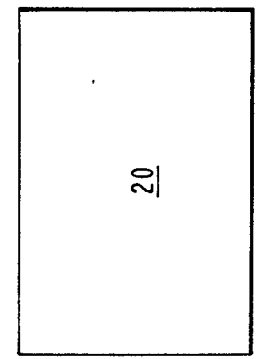
FIG. 2b is a diagrammatic, top plan view, depicting the area-fill resulting from the teaching of the invention.

FIG. 2a shows the printing of dots 10 in accordance with the invention. It will be observed that coalescence is not present. In FIG. 2b, the area-fill pattern 20 is seen to be substantially completely filled and homogenous, in contrast to the prior art methods resulting in the area-fill depicted in FIG. 1b.

Eqn. 1 may be used to determine the time period for printing two adjacent dots. Such printing may be done at time $t=0$ up to time $t=\approx 10$ sec. Typically, the time differential is about 2 sec. The governing parameter is that the second drop being printed should not violate Eqn. 1. However, in an area-fill pattern, such as shown in FIG. 2b, at least about 75% of the applied dots should obey Eqn. 1.

Alternative approaches contemplated by the invention that yield the same desireable result involve interleaving dots on one scan line. For example, a pattern of dots employing both colors together may be formed, alternating the sequence of firing by forming dots of both colors at the same selected locations, then scanning the line a second time to form dots of both colors at alternate, or interleaved, locations. Another approach is to print alternate lines. Here, the first, third, fifth, etc. lines are printed, followed by the second, fourth, sixth, etc. lines.

For achieving a higher color density with a single ink, the same methods are employed, namely, either depositing a second drop of ink a given time after depositing the first drop of ink at the same location or interleaving dots on the same rows or between lines.

The method of the invention is applicable to any ink-jet printer, ink and medium combination. The time required between depositing drops of ink at the same location is readily determined by measuring the time taken for the disappearance of drip lines or coalescence.

Also, the method of the invention is applicable to any transparency substrate material, either hydrophilic or hydrophobic, provided Eqn. 1 and the aforementioned conditions are obeyed. Examples of suitable media include films of polyesters, cellulose and cellulose acetates, styrenes, polypropylenes, polyvinylchloride, and the like.

INDUSTRIAL APPLICABILITY

The method of the invention is applicable to forming overhead transparency projections using ink-jet printing.

EXAMPLES

EXAMPLE 1

It is the practice in the art of ink-jet printing to deliver drop onto drop of two different color inks to achieve a third color. For example, cyan on yellow produces green. It is a preferred embodiment of the method of the invention to perform such drop onto drop ink delivery in two successive print head passes. Those image colors which are produced by two jet colors are given one jet color in each pass and where the image is of only one jet color, a drop of the same color is given in each pass to give equivalent final density of all images' colors.

EXAMPLE 2

Another embodiment of the disclosed method is to interleave ink drops. That is, to print every other drop in the first print pass and then print the remaining drops on the subsequent pass.

EXAMPLE 3

Yet another embodiment of the disclosed method has been demonstrated by printing alternating drop rows in a first pass and then the remaining drop rows in a second pass.

EXAMPLE 4

Still another embodiment of the disclosed method is to print full drop rows, then half-step the print head and print a drop row between the original rows in a second pass.

Thus, there has been disclosed a method of generating overhead transparency projections by ink-jet printers in which a time delay is employed to either print the same dots of color or to print adjacent dots of color. Many obvious changes and modifications will occur to those of ordinary skill in the art, and all such changes and modifications are considered to fall within the scope of the invention, as defined by the appended claims.

What is claimed is:

1. A method of printing at least two dots of ink sequentially at a particular location to form a spot on an ink-receptive transparent medium by an ink-jet printer comprising printing a first dot of ink at said location during a first scan of a line, delaying by a time sufficiently long to allow the first dot of ink to absorb into said ink-receptive medium, and printing a second dot of ink at said location over said first dot of ink during a second scan of said line, said dot separated from an adjacent dot by a dot-to-dot spacing as measured by the number of dots per unit length, wherein an amount of ink which is required to generate a printed spot of diameter $\phi$ meets the condition $\phi \leq 1/D$, where D is the number of dots per unit length.

2. The method of claim 1 wherein only one dot of ink is printed on said medium at selected locations during the first scan of said line, and a second dot of ink, is printed at said locations during the second scan of said line.

3. The method of claim 1 wherein dots of ink of two colors are printed at alternate selected locations during said first scan and dots of ink of said two colors are printed at remaining selected locations during said second scan.

4. The method of claim 1 wherein dots of ink of one color are printed at said locations during said first scan and dots of ink of a different color are printed at said locations during the second scan.

5. The method of claim 1 wherein dots of one color are printed at said locations during both the first scan and the second scan.

6. The method of claim 1 wherein a dot of ink is printed at alternate selected locations during said first scan and a dot of ink is printed at remaining selected locations during said second scan.

7. The method of claim 1 wherein said medium is selected from the group consisting of polyesters, cellulose and cellulose acetates, styrenes, polypropylenes, and polyvinylchloride.

8. A method of printing an area-filled pattern comprising a plurality of scan lines on an ink-receptive transparent medium by an ink-jet printer comprising printing dots in one scan of a line, returning to the beginning of the line, and over-printing a second row of dots in said line, said dots separated from adjacent dots by a dot-to-dot spacing as measured by the number of dots per unit length, at least about 75% of said dots being applied in an amount to generate spots of diameter $\phi$ where $\phi \leq D$ and D is the number of dots per unit length.

9. A method of printing at least two dots of ink sequentially at a particular location on an overhead transparency having an ink-receptive coating thereon by an ink-jet printer comprising printing a first dot of ink at said location during a first scan of a line, delaying by a time sufficiently long to allow the first dot of ink to absorb into said ink-receptive coating, and printing a second dot of ink at said location over said first dot of ink during a second scan of said line, said dot separated from an adjacent dot by a dot-to-dot spacing as measured by the number of dots per unit length, wherein an amount of ink which is required to generate a printed spot of diameter $\phi$ meets the condition $\phi \leq 1/D$, where D is the number of dots per unit length.

10. The method of claim 9 wherein only one dot of ink is printed on said medium at selected locations during the first scan of said line, and a second dot of ink is printed at said locations during the second scan of said line.

11. The method of claim 10 wherein a dot of ink is printed at alternate selected locations during said first scan and a dot of ink is printed at remaining selected locations during said second scan.

12. The method of claim 9 wherein dots of ink of two colors are printed at alternate selected locations during said first scan and dots of ink of said two colors are printed at remaining selected locations during said second scan.

13. The method of claim 9 wherein dots of ink of one color are printed at said locations during said first scan and dots of ink of a different color are printed at said locations during the second scan.

14. The method of claim 9 wherein dots of one color are printed at said locations during both the first scan and the second scan.

* * * * *